S. E. DAVIS.
DISK DRILL.
APPLICATION FILED SEPT. 21, 1908.

939,812. Patented Nov. 9, 1909.

Witnesses:
R. P. Hicks.
A. H. Opsahl.

Inventor,
Spencer E. Davis.
By his Attorneys
Williamson Merchant

UNITED STATES PATENT OFFICE.

SPENCER E. DAVIS, OF MINNEAPOLIS, MINNESOTA.

DISK DRILL.

939,812.  Specification of Letters Patent.  Patented Nov. 9, 1909.

Application filed September 21, 1908. Serial No. 454,061.

*To all whom it may concern:*

Be it known that I, SPENCER E. DAVIS, a citizen of the United States, residing at Minneapolis, in the county of Hennepin and State of Minnesota, have invented certain new and useful Improvements in Disk Drills; and I do hereby declare the following to be a full, clear, and exact description of the invention, such as will enable others skilled in the art to which it appertains to make and use the same.

My invention has for its especial object to provide an improved disk drill, and to this end, it consists of the novel devices and combinations of devices hereinafter described and defined in the claims.

In what is known as dry farming, very greatly improved results have been obtained by planting the seeds in a hard packed bed, and covering this packed bed with loose earth. It has been found that moisture will be drawn from the ground in greatest quantities to a hard packed bed or surface, and that if this hard packed bed or surface be exposed to the atmosphere, evaporation will rapidly carry away the moisture, while if such hard packed bed be covered with loose earth, the moisture will be held in the ground for a very much greater length of time. My improved disk drill has been especially designed to provide this latter noted condition in planting, and to this end, in connection with the customary diverging disks, I employ a presser wheel or colter and a drag device, such as a chain, with the said presser wheel arranged to run centrally between the disks, so as to pack the planted seeds in a hard or tightly pressed bed, and with the said chain or drag device arranged to deposit the loose earth over this tightly packed seed containing bed.

In the accompanying drawing which illustrates the invention, like characters indicate like parts throughout the several views.

Figure 1:
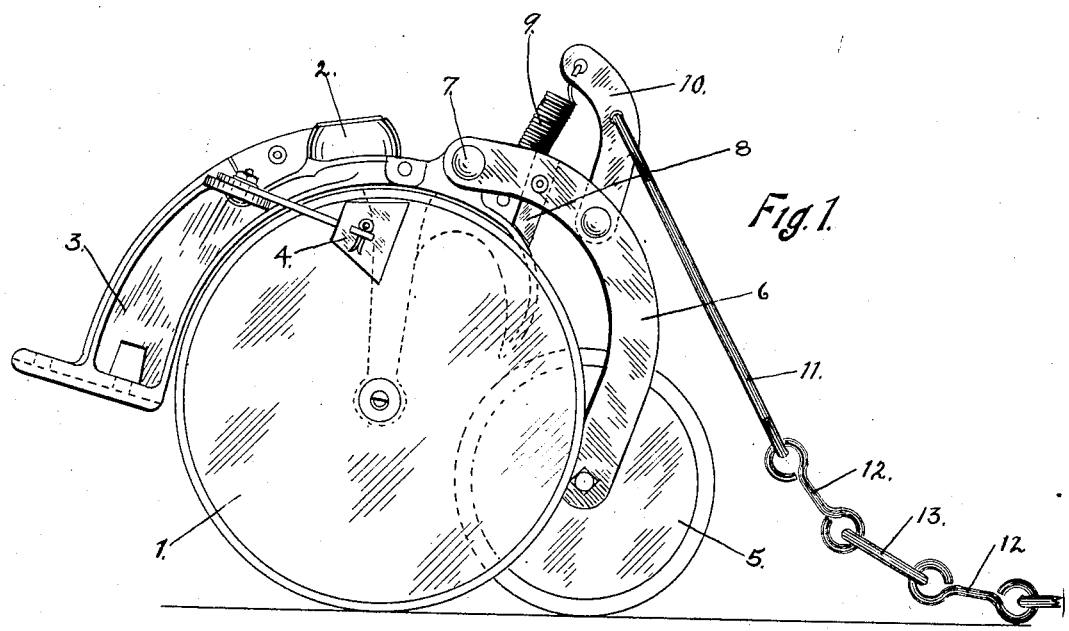
Figure 2:
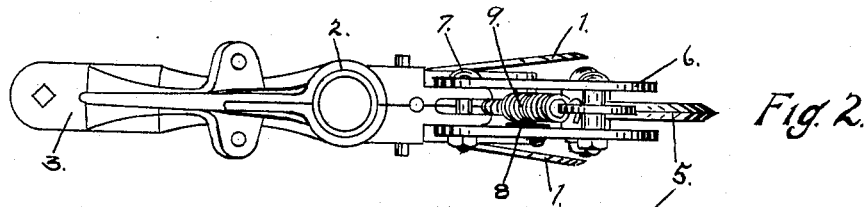
Figure 3:
Figure 4:
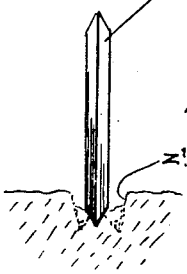

Referring to the drawings: Figure 1 is a view in side elevation showing the improved drill and the attachments thereto. Fig. 2 is a plan view of the parts shown in Fig. 1, the drag chain being removed. Fig. 3 is a sectional view showing approximately the form of the furrow formed by the two drill disks; and Fig. 4 is a similar view illustrating the action of the presser wheel on the furrow after the seeds have been planted therein.

The drill disks 1 are journaled in the usual or any suitable way to trunnions of a seed boot 2, which has the customary frame 3, to which the drag bar, not shown, is adapted to be attached in the usual way.

The numeral 4 indicates scrapers of suitable construction, applied in the usual or any suitable way, but which constitute no part of this invention.

The presser wheel or colter 5, is located between, and journaled to the lower ends of a pair of curved bars 6, that are pivotally connected at 7 to a rearwardly extended lug of the boot 2.

The numeral 8 indicates a stop arm on one of the bars 6, which engages a rearwardly projecting portion of the boot 2 and limits the forward swinging movement of the bar 6.

In this preferred construction, the presser wheel 5 is yieldingly held downward by a strong coiled spring 9, the lower end of which is attached to a rearward projection of the boot 2, and the upper end of which is shown as attached to a curved arm 10, that is rigidly secured to the intermediate portions of the bars 6.

The so-called drag chain or drag attachment, is, as shown, made up of a rod 11, short links 12, and rings 13, of which links and rings there may be any desired number. The upper end of the rod 11 is shown as loosely pivoted to the arm 10.

Under the forward movement of the device, the disks 1 will form a furrow of substantially the form shown at Z in Fig. 3, and the seeds indicated at Y, will be dropped partly into each of the V-shaped grooves of the said furrow. The presser wheel 5 is preferably formed with a reversely beveled approximately V-shaped running face, best shown in Fig. 4, and it is arranged to run in the central portion of the furrow Z and thereby split, as it were, the central ridge of the said furrow and tightly pack the same therein on the top of the seeds Y, thereby planting the said seeds in a tightly packed furrow, having approximately the form indicated at $Z^1$ in Fig. 4.

The drag connection or chain which follows immediately behind the presser wheel and runs in the furrow $Z^1$, will carry loose earth from the surface of the ground or from the upper portion of the furrow, and will deposit the same loosely over the entire hard packed surface of the seed bed. With the furrow and seed bed thus formed, the moisture which is drawn to the hard packed surface thereof, will be protected by the loose covering of earth from the direct evaporating action of the sun and of the wind, and hence, meets the requirements of so-called dry planting or farming.

It is important that the presser wheel or colter be located well forward between the disks, so that it will act upon the bottom of the furrow and pack the earth around the seeds immediately after the said seeds have been deposited in the furrow. In some forms of drill disks, the boot is arranged to deliver the seeds ahead of the axis of the disks, and with such a drill disk, the presser wheel might have its axis located forward nearly, or quite as far forward as the disks themselves.

What I claim is:

1. In a device of the kind described, the combination with a pair of diverging disks, and a seed boot to which said disks are journaled, of a presser wheel arranged to run between said disks, the said presser wheel being interlapped with the said disks, substantially as described.

2. In a device of the kind described, the combination with disks for opening the furrow, of a presser wheel interlapped with and arranged to run between said disks, and a drag device arranged to work behind said presser wheel, substantially as described.

3. In a device of the kind described, the combination with a seed boot and a pair of diverging disks journaled thereto, of a pair of laterally spaced downwardly curved bars pivotally connected at their upper ends to said seed boot, a presser wheel interlapped with and located between, and journaled to the lower ends of said bars, and arranged to work between the rear portions of said disks, a spring connection between said seed boot and the said bars, yieldingly forcing said presser wheel downward, and a drag chain connected to said bars and arranged to work behind said presser wheel, substantially as described.

In testimony whereof I affix my signature in presence of two witnesses.

SPENCER E. DAVIS.

Witnesses:
H. D. KILGORE,
F. D. MERCHANT.